US011275266B2

(12) United States Patent
Chang et al.

(10) Patent No.: US 11,275,266 B2
(45) Date of Patent: Mar. 15, 2022

(54) LAMINATE AND LIQUID CRYSTAL DISPLAY DEVICE COMPRISING SAME

(71) Applicant: LG CHEM, LTD., Seoul (KR)

(72) Inventors: Junwon Chang, Daejeon (KR); Moon Soo Park, Daejeon (KR); Kyun Il Rah, Daejeon (KR); Sun Kug Kim, Daejeon (KR); Nayoung Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/769,174

(22) PCT Filed: Jun. 3, 2019

(86) PCT No.: PCT/KR2019/006658
§ 371 (c)(1),
(2) Date: Jun. 2, 2020

(87) PCT Pub. No.: WO2019/235792
PCT Pub. Date: Dec. 12, 2019

(65) Prior Publication Data
US 2021/0215970 A1      Jul. 15, 2021

(30) Foreign Application Priority Data
Jun. 5, 2018   (KR) .................. 10-2018-0064875

(51) Int. Cl.
G02F 1/1335      (2006.01)
G02F 1/13363    (2006.01)
G02B 5/30          (2006.01)

(52) U.S. Cl.
CPC ....... *G02F 1/133531* (2021.01); *G02B 5/305* (2013.01); *G02F 1/133634* (2013.01); *G02F 1/133638* (2021.01)

(58) Field of Classification Search
CPC ......... G02F 1/133531; G02F 1/133541; G02F 1/133638; G02F 1/133634;
(Continued)

(56) References Cited

U.S. PATENT DOCUMENTS

| 2005/0151896 A1 | 7/2005 | Hara et al. |
| 2006/0203159 A1 | 9/2006 | Kawamoto et al. |
| 2007/0177086 A1* | 8/2007 | Ishitani ............... H01L 51/5281 349/117 |

(Continued)

FOREIGN PATENT DOCUMENTS

| JP | 2006-268007 A | 10/2006 |
| JP | 2007-108436 A | 4/2007 |

(Continued)

OTHER PUBLICATIONS

English language translation of WIPO Patent Application No. WO 2018061959. Downloaded on Jun. 16, 2021 from the European Patent Office website at https://worldwide.espacenet.com/. English language translation provided by Google Translate tool on site. (Year: 2016).*

*Primary Examiner* — Angela K Davison
(74) *Attorney, Agent, or Firm* — Dentons US LLP

(57) ABSTRACT

This application relates to a laminate which comprises: a first polarization rotation layer; a second polarization rotation layer; and a positive C plate provided between the first polarization rotation layer and the second polarization rotation layer, the first polarization rotation layer comprises a first quarter wave plate, and the second polarization rotation layer comprises a first three-quarter wave plate and a liquid crystal display comprising the same.

13 Claims, 3 Drawing Sheets

(58) Field of Classification Search
CPC .......... G02F 1/133637; G02F 2413/07; G02B 5/3025; G02B 5/3041; G02B 5/305
See application file for complete search history.

(56) References Cited

U.S. PATENT DOCUMENTS

| | | |
|---|---|---|
| 2010/0226007 A1 | 9/2010 | Hara et al. |
| 2011/0183839 A1 | 7/2011 | Fujisawa et al. |
| 2015/0070764 A1 | 3/2015 | Hatanaka et al. |
| 2016/0377781 A1 | 12/2016 | Park et al. |
| 2017/0192145 A1* | 7/2017 | Furuki ............... H01L 51/5281 |
| 2017/0315410 A1 | 11/2017 | Oosawa |
| 2018/0006275 A1 | 1/2018 | Maruyama et al. |
| 2018/0095211 A1 | 4/2018 | Lee et al. |
| 2019/0064413 A1 | 2/2019 | Kobayashi |

FOREIGN PATENT DOCUMENTS

| | | |
|---|---|---|
| JP | 200931402 A | 2/2009 |
| JP | 2015-040904 A | 3/2015 |
| JP | 2017504079 A | 2/2017 |
| JP | 6175972 B2 | 8/2017 |
| JP | 2018-060152 A | 4/2018 |
| KR | 10-2004-0097373 A | 11/2004 |
| KR | 10-2015-0029562 A | 3/2015 |
| KR | 10-2016-0112380 A | 9/2016 |
| KR | 10-2017-0118805 A | 10/2017 |
| KR | 10-2018-0036864 A | 4/2018 |
| TW | 201738596 A | 11/2017 |
| TW | I610096 B | 1/2018 |
| WO | 2017170346 A1 | 10/2017 |

* cited by examiner

[Figure 1] - CONVENTIONAL
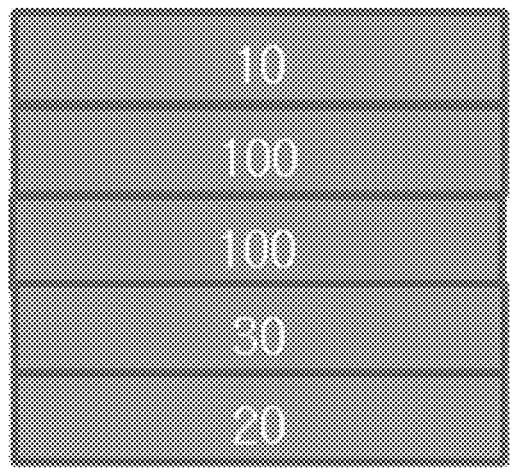
[Figure 2]
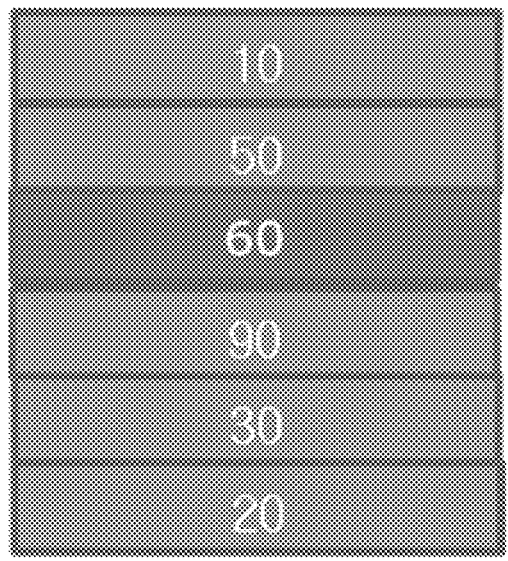

[Figure 3]
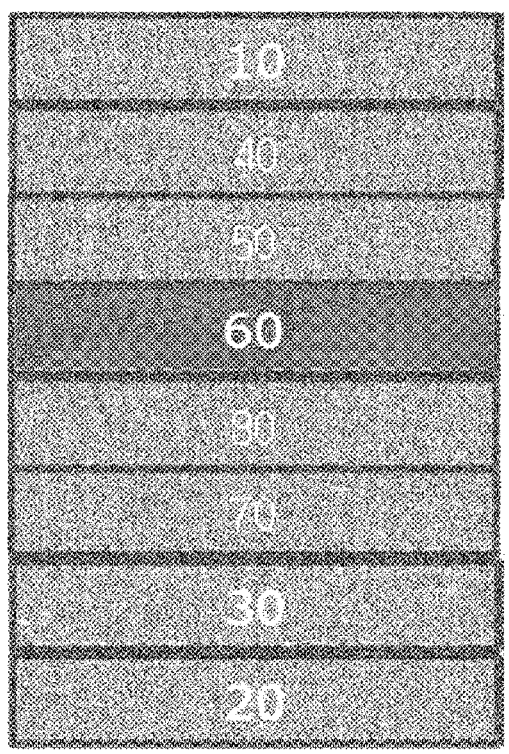

[Figure 4]
<Example 1>
[Black Luminance]
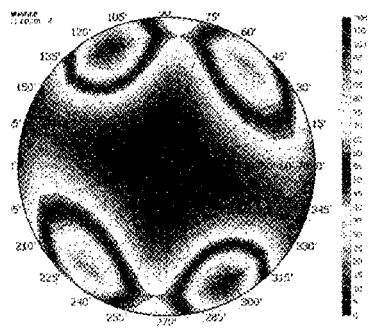
[Contrast Ratio]
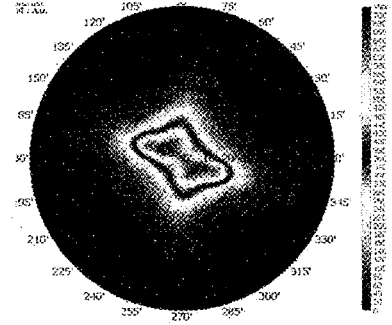
<Example 2>
[Black Luminance]
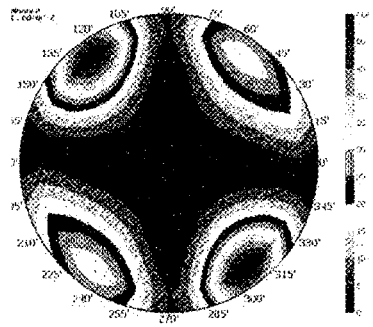
[Contrast Ratio]
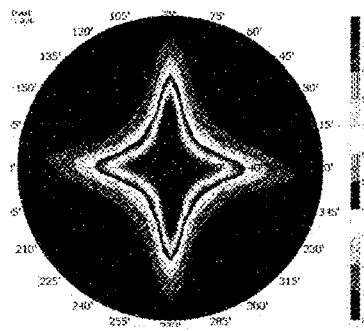
<Comparative Example 1>
[Black Luminance]
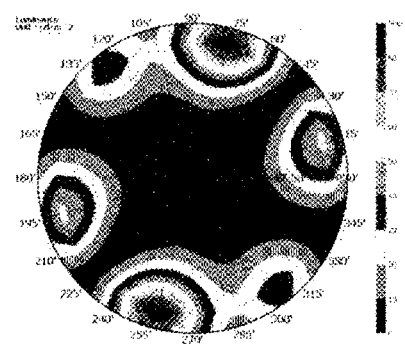
[Contrast Ratio]
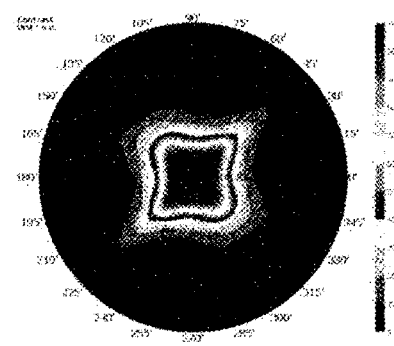

LAMINATE AND LIQUID CRYSTAL DISPLAY DEVICE COMPRISING SAME

The present application is a National Phase entry pursuant to 35 U.S.C. § 371 of International Application No. PCT/KR2019/006658 filed on Jun. 3, 2019, and claims priority to and the benefit of Korean Patent Application No. 10-2018-0064875 filed in the Korean Intellectual Property Office on Jun. 5, 2018, the entire contents of which are incorporated herein by reference.

FIELD

This application relates to a laminate and a liquid crystal display comprising the same.

BACKGROUND

In recent years, as there has been a growing interest in information displays and demand for portable information medium has increased, research and commercialization of a lightweight thin film flat panel display (FPD), which replaces a cathode ray tube (CRT), which is the existing display device, have been mainly carried out. In particular, among such flat panel display devices, a liquid crystal display (LCD) as a device for displaying an image using optical anisotropy of a liquid crystal is excellent in resolution, color display, and image quality, and is actively applied to notebook or desktop monitors.

In such a liquid crystal display, liquid crystal molecules of a liquid crystal layer are driven by a difference in voltage applied to a common electrode and a pixel electrode.

Liquid crystals have features such as dielectric anisotropy and refractive anisotropy. Dielectric anisotropy means that the degree of polarization induced by an electric field varies depending on long axis and short axis directions of the liquid crystal, and refractive anisotropy means that a refractive index varies depending on the long axis and short axis directions of the liquid crystal, which causes a polarization state to be changed because the refractive index felt varies according to a direction when light passes through the liquid crystal molecules.

As a result, the liquid crystal display has a liquid crystal panel constituted by a pair of transparent insulating substrates formed by planes facing each other with the liquid crystal layer interposed therebetween as a required component, and arbitrarily controls the polarization of the liquid crystal molecules through a change in electric field between respective electric field generating electrodes, and displays various images by using transmittance of light which is changed at this time.

In this case, a polarizer is located at each of upper and lower portions of the liquid crystal panel and the polarizer transmits the light of a polarization component, which coincides with a transmission axis to determine a transmission degree of light by arrangement of transmission axes of two polarizers and arrangement characteristics of the liquid crystals.

The polarizer used in the liquid crystal display in the related art is mainly a PVA elongated type in which iodine ions are aligned through stretching by using polyvinyl alcohol (PVA) having good adsorption ability with iodine.

SUMMARY

This application has been made in an effort to provide a liquid crystal display capable of resolving a size limitation of a polarizer and having an enhanced front CR characteristic.

An embodiment of this application provides a laminate comprising: a first polarization rotation layer; a second polarization rotation layer; and a positive C plate provided between the first polarization rotation layer and the second polarization rotation layer, in which the first polarization rotation layer comprises a first quarter wave plate and the second polarization rotation layer comprises a first three-quarter wave plate.

Further, another embodiment of this application provides a liquid crystal display comprising: an upper polarizer; a lower polarizer; and a liquid crystal panel provided between the upper polarizer and the lower polarizer, in which the upper polarizer and the lower polarizer are provided such that absorption axes thereof are parallel to each other, a first polarization rotation layer, a positive C plate, and a second polarization rotation layer are sequentially disposed between the upper polarizer and the liquid crystal panel, the first polarization rotation layer comprises a first quarter wave plate or a first half wave plate and a first quarter wave plate, the second polarization rotation layer comprises a first three-quarter wave plate or a second half wave plate and a second quarter wave plate, and the liquid crystal panel is a horizontally aligned liquid crystal mode.

According to an embodiment of the present application, absorption axes of an upper polarizer and a lower polarizer of a liquid crystal display are provided parallel to each other, thereby resolving a size limitation of a polarizer according to a width of a polarizer raw material.

Further, according to an embodiment of this application, a first polarization rotation layer, a positive C plate, and a second polarization rotation layer are disposed between an upper polarizer and a liquid crystal panel. As a result, black luminance is reduced due to scattering of side light to increase a front contrast ratio (CR) as compared with a case where the first polarization rotation layer, the positive C plate, and the second polarization rotation layer are provided between a lower polarizer and the liquid crystal panel.

Further, according to an embodiment of this application, the positive C plate is disposed between the first polarization rotation layer and the second polarization rotation layer to minimize light leakage at a viewing angle in a dark state, thereby finally minimizing reduction of a contrast ratio (CR).

BRIEF DESCRIPTION OF THE DRAWINGS

FIG. 1 is a schematic illustration of a structure of a liquid crystal display in the related art.

Each of FIGS. 2 and 3 is a schematic illustration of a structure of a liquid crystal display according to embodiments of this application.

FIG. 4 is illustrating collection of illustrations of black illuminance and contrast ratio for Examples 1-2 and Comparative Example 1 of the present application.

EXPLANATION OF REFERENCE NUMERALS AND SYMBOLS

10: Upper polarizer
20: Lower polarizer
30: Liquid crystal panel
40: First half wave plate
50: First quarter wave plate
60: Positive C plate
70: Second half wave plate
80: Second quarter wave plate
90: First three-quarter wave plate
100: half wave plate

DETAILED DESCRIPTION

Hereinafter, preferred embodiments of the present application will be described. However, the embodiments of the present application may be modified into various other forms, and the scope of the present application is not limited to the embodiments described below. Further, the embodiments of the present application are provided for more completely describing the present application to those having average knowledge in the art.

In this specification, a case where a part "comprises" an element will be understood to imply the inclusion of stated elements but not the exclusion of any other elements unless explicitly described to the contrary.

In a liquid crystal display in the related art, an absorption axis of any one polarizer of an upper polarizer and a lower polarizer is set to 0 degree and the absorption axis of the other one polarizer is set to 90 degrees, and the absorption axes of the upper polarizer and the lower polarizer are orthogonal to each other. However, when the absorption axis of the polarizer is 90 degrees, a horizontal length of the polarizer is limited by a width of a roll from which the polarizer is manufactured, and becomes a limiting factor for enlarging product size. A maximum width of the roll from which a current polarizer is manufactured is approximately 2600 mm, which means that a maximum size of a 21:9 standard TV is approximately 110 inches.

In order to avoid such limitations of the size of a polarizer, a method for transversely stretching polyvinyl alcohol (PVA) film to form the absorption axis of a polarizer roll in the TD is proposed. However, even in such a case, unevenness due to lowering of the uniformity of the transverse stretching may occur, and the degree of polarization due to the lowering of a stretching ratio may be reduced.

Thus, in this application, the absorption axes of the upper polarizer and the lower polarizer of the liquid crystal display are all set to 0 degree, thereby resolving the size limitation of the polarizer according to the width of the polarizer raw material.

A laminate according to an embodiment of this application comprises: a first polarization rotation layer; a second polarization rotation layer; and a positive C plate provided between the first polarization rotation layer and the second polarization rotation layer, the first polarization rotation layer comprises a first quarter wave plate, and the second polarization rotation layer comprises a first three-quarter wave plate.

Further, a liquid crystal display according to an embodiment of this application comprises: an upper polarizer; a lower polarizer; and a liquid crystal panel provided between the upper polarizer and the lower polarizer, the upper polarizer and the lower polarizer are provided so that their absorption axes are parallel to each other, the liquid crystal display sequentially comprises the first polarization rotation layer, the positive C plate, and the second polarization rotation layer between the upper polarizer and the liquid crystal panel, the first polarization rotation layer comprises a first quarter wave plate or a first half wave plate and a first quarter wave plate, and the second polarization rotation layer comprises a first three-quarter wave plate or a second half wave plate and a second quarter wave plate, and the liquid crystal panel is a vertical alignment liquid crystal mode.

In an embodiment of this application, the upper polarizer and the lower polarizer are provided such that the absorption axes thereof are parallel to each other. As described above, both of the absorption axes of the upper polarizer and the lower polarizer may be 0 degree in order to resolve the size limitation of the polarizer according to a width of a polarizer raw material.

In an embodiment of this application, the case where the liquid crystal display comprises the first polarization rotation layer, the positive C plate, and the second polarization rotation layer between the upper polarizer and the liquid crystal panel is more preferable than the case where the liquid crystal display comprises the first polarization rotation layer, the positive C plate, and the second polarization rotation layer between the lower polarizer and the liquid crystal panel.

In an embodiment of this application, with regard to the upper polarizer and the lower polarizer, the polarizer attached to a TFT glass surface, which is a lower portion of the liquid crystal panel, based on the liquid crystal panel, is referred to as the lower polarizer and the polarizer attached to an upper portion of the liquid crystal panel which is the opposite side thereof is referred to as the upper polarizer.

Light emitted from a backlight unit (BLU) and incident on the lower polarizer has a black luminance increasing element at the front due to scattering inside a cell in a lower panel. In this case, scattered light may be absorbed by the polarizer of an upper plate as long as there is no retardation of a lower plate, so that, as compared to the case where the liquid crystal display comprises the first polarization rotation layer, the positive C plate, and the second polarization rotation layer between the lower polarizer and the liquid crystal panel, in the case where the liquid crystal display comprises the first polarization rotation layer, the positive C plate, and the second polarization rotation layer between the upper polarizer and the liquid crystal panel, the black luminance is reduced due to side light scattering, and as a result, a front CR is increased.

In an embodiment of this application, the first polarization rotation layer may comprise the first quarter wave plate and the second polarization rotation layer may comprise the first three-quarter wave plate. In this case, the angle formed between the optical axis of the first quarter wave plate of the first polarization rotation layer and the absorption axis of the upper polarizer may be 40 to 50 degrees and may be 42.5 to 47.5 degrees and the angle formed between the optical axis of the first three-quarter wave plate of the second polarization rotation layer and the absorption axis of the upper polarizer may be 130 to 140 degrees and may be 132.5 to 137.5 degrees.

Further, in an embodiment of this application, the first polarization rotation layer may comprise the first half wave plate and the first quarter wave plate and the second polarization rotation layer may comprise the second half wave plate and the second quarter wave plate. In this case, the first quarter wave plate of the first polarization rotation layer may be provided on the positive C plate and the second quarter wave plate of the second polarization rotation layer may be provided on the positive C plate. Further, in an embodiment of this application, an angle formed between an optical axis of the first half wave plate of the first polarization rotation layer and the absorption axis of the upper polarizer may be 10 to 20 degrees, and may be 12.5 to 17.5 degrees, and the angle between the optical axis of the first quarter wave plate of the first polarization rotation layer and the absorption axis of the upper polarizer may be 70 to 80 degrees, and may be 72.5 to 77.5 degrees. Further, the angle formed between the optical axis of the second quarter wave plate of the second polarization rotation layer and the absorption axis of the upper polarizer may be 10 to 20 degrees, and may be 12.5 to 17.5 degrees, and the angle between the optical axis of the second half wave plate of the second polarization rotation layer and the absorption axis of the upper polarizer may be 70 to 80 degrees, and may be 72.5 to 77.5 degrees.

When the angle deviates from the angle, 90-degree linearly polarized light conversion may not be made (e.g., 0 degree→90 degrees), and as a result, the optical axis is not orthogonal to the absorption axis of the upper polarizer and light leakage occurs in black and the CR thus drops.

When the first polarization rotation layer comprises the first quarter wave plate and the second polarization rotation layer comprises the first three-quarter wave plate, as the ideal optical axis angle, the angle formed between the optical axis of the first quarter wave plate of the first polarization rotation layer and the absorption axis of the upper polarizer is 45 degrees, and the angle formed between the optical axis of the first three-quarter wave plate of the second polarization rotation layer and the absorption axis of the upper polarizer is 135 degrees.

Further, when the first polarization rotation layer comprises the first half wave plate and the first quarter wave plate, and the second polarization rotation layer comprises the second half wave plate and the second quarter wave plate, as the ideal optical axis angle, the angle formed between the optical axis of the first half wave plate of the first polarization rotation layer and the absorption axis of the upper polarizer is 15 degrees, and the angle formed between the optical axis of the first quarter wave plate and the absorption axis of the upper polarizer is 75 degrees. Further, as the ideal optical axis angle, the angle formed between the optical axis of the second quarter wave plate of the second polarization rotation layer and the absorption axis of the upper polarizer is 15 degrees, and the angle formed between the optical axis of the first half wave plate and the absorption axis of the upper polarizer is 75 degrees. The reason for setting the above range is that consideration is given to manufacturing tolerances of general optical films.

The first half wave plate and the second half wave plate may be made of materials known in the art and is not particularly limited. For example, polyolefin (polyethylene, polypropylene, polynorbornene and the like), amorphous polyolefin, polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, cellulose-based polymer (such as triacetyl cellulose), PVA, epoxy resin, phenol resin, norbornene resin, polyester resin, acrylic resin, vinyl chloride resin, vinylidene chloride resin, etc., may be singly used or two or more thereof may be mixedly used, but this application is not limited thereto.

The first half wave plate and the second half wave plate may be obtained by forming the resin compositions and performing uniaxial or biaxial stretching. Further, as the first half wave plate and the second half wave plate, an alignment film in which a liquid crystalline polymer or a liquid crystalline monomer is aligned may be used.

The first half wave plate and the second half wave plate are retarders in which the retardation is implemented as half so that the relative phase difference between the e-ray and the o-ray becomes $\pi$. The phase difference may be represented as $\Delta nd$ and the half wave plate may be manufactured by adjusting a thickness according to $\Delta nd$ of a material.

The first quarter wave plate and the second quarter wave plate may be made of materials known in the art and is not particularly limited. For example, the quarter wave plate may be formed by a uniaxially stretched cycloolefin based film, a uniaxially stretched polyethylene terephthalate film, a uniaxially stretched polycarbonate film, or a liquid crystal film.

The first quarter wave plate and the second quarter wave plate may be obtained by forming the resin compositions and performing uniaxial or biaxial stretching. Further, as the first quarter wave plate and the second quarter wave plate, an alignment film in which a liquid crystalline polymer or a liquid crystalline monomer is aligned may be used.

The first quarter wave plate and the second quarter wave plate are films made so that the relative phase difference between the e-ray and the o-ray becomes $\pi/2$. Linear polarization is made to circular polarization, or the circular polarization is made to the linear polarization.

The three-quarter wave plate may be made of materials known in the art and is not particularly limited. For example, the quarter wave plate may be formed by a uniaxially stretched cycloolefin based film, a uniaxially stretched polyethylene terephthalate film, a uniaxially stretched polycarbonate film, or a liquid crystal film.

The first three-quarter wave plate may be obtained by forming the resin compositions and performing uniaxial or biaxial stretching. Further, as the first three-quarter wave plate, an alignment film in which a liquid crystalline polymer or a liquid crystalline monomer is aligned may be used.

The first three-quarter wave plate is a film made so that the relative phase difference between the e-ray and the o-ray becomes $3\pi/2$. Linear polarization is made to be circular polarization or the circular polarization is made to be the linear polarization.

In an embodiment of this application, the positive C plate is provided between the first polarization rotation layer and the second polarization rotation layer.

In this application, the positive C plate means a film having a refractive index distribution of $n_z > n_x = n_y$. In this case, $n_x$ represents a refractive index in a direction in which a plane-direction refractive index of the film becomes maximum, $n_y$ represents a vertical refractive index in an $n_x$ direction in a plane direction of the film, and $n_z$ represents a thickness-direction refractive index of the film.

The positive C plate, which is known to the art, may be used and is not particularly limited. More specifically, the positive C plate may be prepared by aligning a polymer film in an appropriate method or may be prepared by coating a polymeric cholesteric liquid crystal compound on one surface of a substrate, aligning the polymer film in a predetermined direction, and then curing. When the polymerizable cholesteric liquid crystal compound is used, a zero retardation film may be used as the substrate. In this application, the zero retardation film means a film in which substantially no retardation occurs even though light is transmitted.

The generally used positive C plate as a vertical alignment liquid crystal layer may mean a liquid crystal polymer layer comprising substantially vertically aligned liquid crystals and the polymer layer may represent so-called characteristics of the positive C plate. In the above description, the characteristic of the positive C plate may mean that the refractive index $n_x$ in a slow axis direction is substantially equal to the refractive index $n_y$ in a fast axis direction, and the refractive index $n_z$ in a thickness direction is larger than the refractive index $n_y$ in the fast axis direction ($n_z > n_y$). In the above description, the refractive index $n_x$ in the slow axis direction is substantially equal to the refractive index $n_y$ in the fast axis direction, and as a result, if there is a minute difference which occurs due to a process error, etc., is comprised in a scope of substantial equaling. Further, the vertical alignment liquid crystal layer may comprise some liquid crystals which are not vertically aligned if the vertical alignment liquid crystal layer shows the characteristics of the positive C plate. In addition, a dispersion characteristic may have a positive dispersion characteristic or a negative dispersion characteristic.

A thickness-direction retardation value $R_{th}$ of the positive C plate, which is represented by Equation 1 below in 550 nm may be in the range of 50 to 200 nm. Further, the front retardation value $R_o$ of the positive C plate, which is represented by Equation 2 below in 550 nm may be in the range of −5 to 5 nm or may be 0.

$$R_{th}=(n_z-n_y)\times d \quad \text{[Equation 1]}$$

$$R_o=(n_x-n_y)\times d \quad \text{[Equation 2]}$$

In Equations 1 and 2 above, $n_x$ represents a refractive index in a direction in which the plane-direction refractive index of the positive C plate becomes maximum, $n_y$ represents the vertical refractive index in the $n_x$ direction in the plane direction of the positive C plate, $n_z$ represents the thickness-direction refractive index of the positive C plate, and d represents a thickness of the positive C plate.

When a thickness-direction retardation value $R_{th}$ of the positive C plate deviates from the numerical range, horizontal and vertical asymmetry of the optical characteristics may occur and black efficiency may be lowered, and as a result, the front CR value may be lowered. Further, when the thickness-direction retardation value $R_{th}$ of the positive C plate deviates from the numerical range, deterioration of viewing angle characteristics may be caused due to the front CR and an increase in light leakage in a diagonal direction and a color change may be large. As a result, since different optical characteristics are shown depending on a viewing direction, it is difficult to implement uniform performance.

The thickness-direction retardation value $R_{th}$ of the positive C plate may satisfy Equation 3 or 4 below.

$$R_{th}(450)<R_{th}(550)<R_{th}(650) \quad \text{[Equation 3]}$$

$$R_{th}(450)\geq R_{th}(550)\geq R_{th}(650) \quad \text{[Equation 4]}$$

In Equations 3 and 4 above, $R_{th}(450)$ means a thickness direction retardation value at 450 nm, $R_{th}(550)$ means a thickness direction retardation value at 550 nm, and $R_{th}(650)$ means a thickness direction retardation value at 650 nm.

In particular, it is more preferable that the thickness-direction retardation value $R_{th}$ of the positive C plate satisfies Equation 3 above. When the thickness-direction retardation value $R_{th}$ of the positive C plate satisfies Equation 3 above, the thickness-direction retardation value $R_{th}$ has inverse-wave dispersibility and serves to collect a state of light spread for each wavelength at one point to the maximum to serve to prevent light leakage and color change at the viewing angle.

The structure of the liquid crystal display in the related art is schematically illustrated in FIG. 1 and the structure of the liquid crystal display according to an embodiment of this application is schematically illustrated in FIGS. 2 and 3.

The liquid crystal display according to an embodiment of this application comprises the positive C plate (60) between the first polarization rotation layer and the second polarization rotation layer to minimize reduction of a contrast ratio (CR) at the viewing angle.

In an embodiment of this application, the liquid crystal display may additionally comprise a viewing angle compensation film between the second polarization rotation layer and the liquid crystal panel or between the liquid crystal panel and the lower polarizer.

In an embodiment of this application, the upper polarizer (10), the lower polarizer (20), the liquid crystal panel (30), the first half wave plate (40), the first quarter wave plate (50), the positive C plate (60), the second quarter wave plate (80), the second half wave plate (70), the first three-quarter wave plate (90), etc., may be bonded by using a water-based adhesive or a UV curing adhesive or bonded by using a PSA adhesive.

In this application, the upper polarizer (10) and the lower polarizer (20) may be polyvinyl alcohol based polarizers in which at least one of iodine and dichroic dyes is individually dyed.

As an example of the method for preparing the polyvinyl alcohol based polarizer, a method comprising a step of preparing a polyvinyl alcohol polarizer in which iodine and/or a dichroic dye is dyed and a step of laminating a protective film on one surface of the polarizer may be used. For example, the method is not limited thereto, but the step of preparing the polyvinyl alcohol based polarizer may comprise a dyeing step of dyeing the polyvinyl alcohol based polymer film with the iodine and/or the dichroic dye, a cross-linking step of cross-linking the polyvinyl alcohol based film and the dye, and a stretching step of stretching the polyvinyl alcohol film.

A film for protecting the polarizer refers to a transparent film attached on one surface of the polarizer and may adopt a film which is excellent in mechanical strength, thermal stability, moisture shielding property, isotropy, and the like. For example, an acetate based film such as triacetyl cellulose (TAC), and polyester based, polyether sulfone based, polycarbonate based, polyamide based, polyimide based, polyolefin based, cycloolefin based, polyurethane based, and acryl based resin films may be used, but the present application is not limited thereto.

In addition, the protective film may be an isotropic film, may be an anisotropic film having an optical compensation function such as the phase difference, or may be composed of one sheet or may be composed of two or more sheets bonded together. Further, the protective film may be an unstretched, uniaxially or biaxially stretched film, and the thickness of the protective film is generally 1 to 500 μm, and preferably 1 to 300 μm.

Meanwhile, in the step of laminating the protective film on one surface of the polyvinyl alcohol based polarizer, the protective film is bonded to the polarizer and the protective film may be bonded to the polarizer by using the adhesive. In this case, the bonding may be performed through a joining method of the film well known to the art and for example, the bonding may be performed by using adhesives well known to the art, which comprise the aqueous adhesive such as the polyvinyl alcohol based adhesive, a thermosetting adhesive such as the urethane based adhesive, etc., a photo-cation curable adhesive such as the epoxy based adhesive, etc., and optical radical curable adhesives such as the acryl based adhesive, etc.

The liquid crystal display according to an embodiment of the present application may additionally comprise a backlight unit. The backlight unit serves to supply light to the liquid crystal panel and a light source of the backlight unit may adopt any one of a cold cathode fluorescent lamp (CCFL), an external electrode fluorescent lamp (EEFL), a fluorescent lamp of a hot cold fluorescent lamp (HCFL), or a light emitting diode (LED).

In an embodiment of the present application, the liquid crystal panel may be an In Plane Switching (IPS) mode liquid crystal panel or a Plane to Line Switching (PLS) mode liquid crystal panel.

Further, the types of the other constituent elements constituting the liquid crystal display, for example, upper and lower substrates (e.g., color filter substrate or array substrate) are not also particularly limited, and the configurations known in this field may be adopted without the limitation.

EXAMPLES

Hereinafter, the present invention will be described in more detail with reference to examples. The following Examples are provided to aid understanding of the present invention and are not thus intended to limit the present invention.

Example 1

A polarizer (LG Chemical Co., Ltd.) being mass-produced, which is laminated in a TAC/PVA/TAC structure (LG Chemical Co., Ltd.) was cut to have an absorption axis of 0 degree and used as a base substrate and a first quarter wave plate having an optical axis of 45 degrees, the positive C plate, and a first three-quarter wave plate having an optical axis of 135 degrees are sequentially laminated to the polarizer by using an adhesive (a U1 grade adhesive having a thickness of 20 μm). The laminate was attached to an upper portion of an IPS panel (43-inch IPD LCD panel, LG Display) and a general polarizer used as the base substrate was attached to a lower portion of the IPS panel with an absorption axis of 0 degree.

Further, the positive C plate adopted a positive C plate (liquid crystal film, LG Chemical Co., Ltd.) having a thickness-direction retardation value of 140 nm and a front retardation value of 0.

The structure of Example 1 is schematically illustrated in FIG. 2.

Example 2

A polarizer (LG Chemical Co., Ltd.) being mass-produced, which is laminated in a TAC/PVA/TAC structure (LG Chemical Co., Ltd.) was cut to have an absorption axis of 0 degree and used as a base substrate and a first half wave plate having an optical axis of 15 degrees, a first quarter wave plate having an optical axis of 75 degrees, the positive C plate, a second quarter wave plate having an optical axis of 15 degrees, and a second half wave plate having an optical axis of 75 degrees are sequentially laminated to the polarizer by using the adhesive (the U1 grade adhesive having a thickness of 20 μm). The laminate was attached to an upper portion of an IPS panel (43-inch IPD LCD panel, LG Display) and a general polarizer used as the base substrate was attached to a lower portion of the IPS panel with an absorption axis of 0 degree.

Further, the positive C plate adopted a positive C plate (liquid crystal film, LG Chemical Co., Ltd.) having a thickness-direction retardation value of 140 nm and a front retardation value of 0.

The structure of Example 2 is schematically illustrated in FIG. 3.

Comparative Example 1

A polarizer (LG Chemical Co., Ltd.) being mass-produced, which is laminated in a TAC/PVA/TAC structure (LG Chemical Co., Ltd.) was cut to have an absorption axis of 0 degree and used as a base substrate and a half wave plate having an optical axis of 22.5 degrees and a half wave plate having an optical axis of 67.5 degrees are sequentially laminated to the polarizer by using the adhesive (the U1 grade adhesive having a thickness of 20 μm). The laminate was attached to an upper portion of an IPS panel (43-inch IPD LCD panel, LG Display) and a general polarizer used as the base substrate was attached to a lower portion of the IPS panel with an absorption axis of 0 degree.

The structure of Comparative Example 1 is schematically illustrated in FIG. 1 below.

For the liquid crystal displays of Example 1, Example 2, and Comparative Example 1 above, a simulation was performed by using a Techwiz LCD 1D program and verified by using a 43-inch IPS LCD TV. An evaluation equipment evaluated front luminance and viewing angle characteristics by ELDIM's EZ Contrast equipment and BM7.

Front optical characteristics of the liquid crystal displays of Example 1, Example 2, and Comparative Example 1 above are illustrated in FIG. 4.

Like the result, according to an embodiment of this application, absorption axes of the upper polarizer and the lower polarizer of the liquid crystal display are provided to be parallel to each other, thereby resolving a size limitation of the polarizer according to the width of the polarizer raw material.

Further, according to an embodiment of this application, a first polarization rotation layer, a positive C plate, and a second polarization rotation layer are disposed between an upper polarizer and a liquid crystal panel, and as a result, black luminance is reduced due to scattering of side light to increase a front contrast ratio (CR) as compared with a case where the first polarization rotation layer, the positive C plate, and the second polarization rotation layer are provided between a lower polarizer and the liquid crystal panel.

Further, according to an embodiment of this application, the positive C plate is disposed between the first polarization rotation layer and the second polarization rotation layer to minimize light leakage at a viewing angle in a dark state, thereby finally minimizing reduction of a contrast ratio (CR).

The invention claimed is:

1. A laminate comprising: a first polarization rotation layer; a second polarization rotation layer; and a positive C plate provided between the first polarization rotation layer and the second polarization rotation layer, wherein the first polarization rotation layer comprises a first quarter wave plate and the second polarization rotation layer comprises a first three-quarter wave plate, and wherein a thickness-direction retardation value $R_{th}$ of the positive C plate represented by Equation 1 below at 550 nm is in the range of 50 nm to 200 nm and a front retardation value $R_o$ represented by Equation 2 below at 550 nm is in the range of −5 nm to 5 nm: [Equation 1] $R_{th}=(n_z-n_y)\times d$ [Equation 2] $R_o=(n_x-n_y)\times d$ In Equations 1 and 2 above, $n_x$ represents a refractive index in a direction in which the plane-direction refractive index of the positive C plate becomes maximum, $n_y$ represents the vertical refractive index in the $n_x$ direction in the plain direction of the positive C plate, $n_z$ represents thickness-direction refractive index of the positive C plate, and d represents a thickness of the positive C plate.

2. The laminate of claim 1, wherein the thickness-direction retardation value $R_{th}$ of the positive C plate satisfies Equation 3 below:

$$R_{th}(450)<R_{th}(550)<R_{th}(650) \quad \text{[Equation 3]}$$

In Equation 3 above, $R_{th}(450)$ means a thickness direction retardation at 450 nm, $R_{th}(550)$ means a thickness direction retardation at 550 nm, and $R_{th}(650)$ means a thickness direction retardation at 650 nm.

3. A liquid crystal display comprising: an upper polarizer; a lower polarizer; and a liquid crystal panel provided between the upper polarizer and the lower polarizer, wherein the upper polarizer and the lower polarizer are provided such that absorption axes thereof are parallel to each other, a first polarization rotation layer, a positive C plate, and a second polarization rotation layer are sequentially disposed between the upper polarizer and the liquid crystal panel, the first polarization rotation layer comprises a first quarter wave plate or a first half wave plate and a first quarter wave plate, the second polarization rotation layer comprises a first three-quarter wave plate or a second half wave plate and a second quarter wave plate, and the liquid crystal panel is a horizontally aligned liquid crystal mode, wherein a thickness-direction retardation value $R_{th}$ of the positive C plate represented by Equation 1 below at 550 nm is in the range of 50 nm to 200 nm and a front retardation value $R_o$ represented by Equation 2 below at 550 nm is in the range of −5 nm to 5 nm: [Equation 1] $R_{th}=(n_z-n_y)\times d$ [Equation 2] $Ro=(n_x-n_y)\times d$ In Equations 1 and 2 above, $n_x$ represents a refractive index in a direction in which the plane-direction refractive index of the positive C plate becomes maximum, $n_y$ represents the vertical refractive index in the $n_x$ direction in the plain direction of the positive C plate, $n_z$ represents thickness-direction refractive index of the positive C plate, and d represents a thickness of the positive C plate.

4. The liquid crystal display of claim 3, wherein the thickness-direction retardation value $R_{th}$ of the positive C plate satisfies Equation 3 below:

$$R_{th}(450) < R_{th}(550) < R_{th}(650) \quad \text{[Equation 3]}$$

In Equation 3 above, $R_{th}$ (450) means a thickness direction retardation at 450 nm, $R_{th}(550)$ means a thickness direction retardation at 550 nm, and $R_{th}(650)$ means a thickness direction retardation at 650 nm.

5. The liquid crystal display of claim 3, further comprising:
a viewing angle compensation film between the second polarization rotation layer and the liquid crystal panel or between the liquid crystal panel and the lower polarizer.

6. The liquid crystal display of claim 3, wherein each of the upper polarizer and the lower polarizer is independently a polyvinyl alcohol based polarizer in which at least one of iodine and dichroic dyes is individually dyed.

7. The liquid crystal display of claim 3, wherein the liquid crystal panel is an in plane switching (IPS) mode liquid crystal panel or a plane to line switching (PLS) mode liquid crystal panel.

8. The liquid crystal display of claim 3, wherein the first polarization rotation layer comprises the first quarter wave plate, and
the second polarization rotation layer comprises the first three-quarter wave plate.

9. The liquid crystal display of claim 8, wherein an angle formed between an optical axis of the first quarter wave plate of the first polarization rotation layer and an absorption axis of the upper polarizer is 40 degrees to 50 degrees, and
an angle formed between an optical axis of the first three-quarter wave plate of the second polarization rotation layer and the absorption axis of the upper polarizer is 130 degrees to 140 degrees.

10. The liquid crystal display of claim 3, wherein the first polarization rotation layer comprises the first half wave plate and the first quarter wave plate, and
the second polarization rotation layer comprises the second half wave plate and the second quarter wave plate.

11. The liquid crystal display of claim 10, wherein the first quarter wave plate of the first polarization rotation layer is provided on the positive C plate, and
the second quarter wave plate of the second polarization rotation layer is provided on the positive C plate.

12. The liquid crystal display of claim 10, wherein an angle formed between an optical axis of the first half wave plate of the first polarization rotation layer and an absorption axis of the upper polarizer is 10 degrees to 20 degrees, and
the angle formed between the optical axis of the first quarter wave plate of the first polarization rotation layer and the absorption axis of the upper polarizer is 70 degrees to 80 degrees.

13. The liquid crystal display of claim 10, wherein an angle formed between an optical axis of the second quarter wave plate of the second polarization rotation layer and an absorption axis of the upper polarizer is 10 degrees to 20 degrees, and
the angle formed between the optical axis of the second half wave plate of the second polarization rotation layer and the absorption axis of the upper polarizer is 70 degrees to 80 degrees.

* * * * *